United States Patent
Katsumata et al.

(10) Patent No.: US 7,273,170 B2
(45) Date of Patent: Sep. 25, 2007

(54) VERIFICATION SYSTEM AND PROGRAM CHECK METHOD FOR VERIFICATION SYSTEM

(75) Inventors: Yutaka Katsumata, Inagi (JP); Takumi Kishino, Inagi (JP); Shinichi Eguchi, Inagi (JP); Yasuyuki Higashiura, Inagi (JP); Shinya Iwasaki, Maebashi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 152 days.

(21) Appl. No.: 11/083,288

(22) Filed: Mar. 18, 2005

(65) Prior Publication Data

US 2006/0038006 A1  Feb. 23, 2006

(30) Foreign Application Priority Data

Aug. 19, 2004 (JP) ............................. 2004-239236

(51) Int. Cl.
*G06K 5/00* (2006.01)

(52) U.S. Cl. ...................... 235/382; 235/380; 235/436

(58) Field of Classification Search ................ 235/380, 235/436, 451
See application file for complete search history.

(56) References Cited

U.S. PATENT DOCUMENTS

| 6,268,788 | B1 * | 7/2001 | Gray ........................... 340/5.2 |
| 6,347,398 | B1 | 2/2002 | Parthasarathy et al. |
| 6,694,436 | B1 * | 2/2004 | Audebert ....................... 726/9 |
| 6,776,332 | B2 * | 8/2004 | Allen et al. .................. 235/380 |
| 2003/0074567 | A1 | 4/2003 | Charbonneau |
| 2004/0002882 | A1 | 1/2004 | Safa |

FOREIGN PATENT DOCUMENTS

| WO | WO 01/27723 A1 | 4/2001 |
| WO | WO 03/061186 A1 | 7/2003 |
| WO | WO-2004/021884 A1 | 3/2004 |

* cited by examiner

*Primary Examiner*—Seung Ho Lee
(74) *Attorney, Agent, or Firm*—Westerman, Hattori, Daniels & Adrian, LLP.

(57) ABSTRACT

In a verification system which verifies individual input data against registered data to perform individual authentication, the verification program is checked for alteration. Programs for verification in a processing unit are checked for alteration by a check program in the tamper-proof environment of a lower-level storage unit. Hence illicit use of the verification system through program alteration can be prevented.

14 Claims, 7 Drawing Sheets

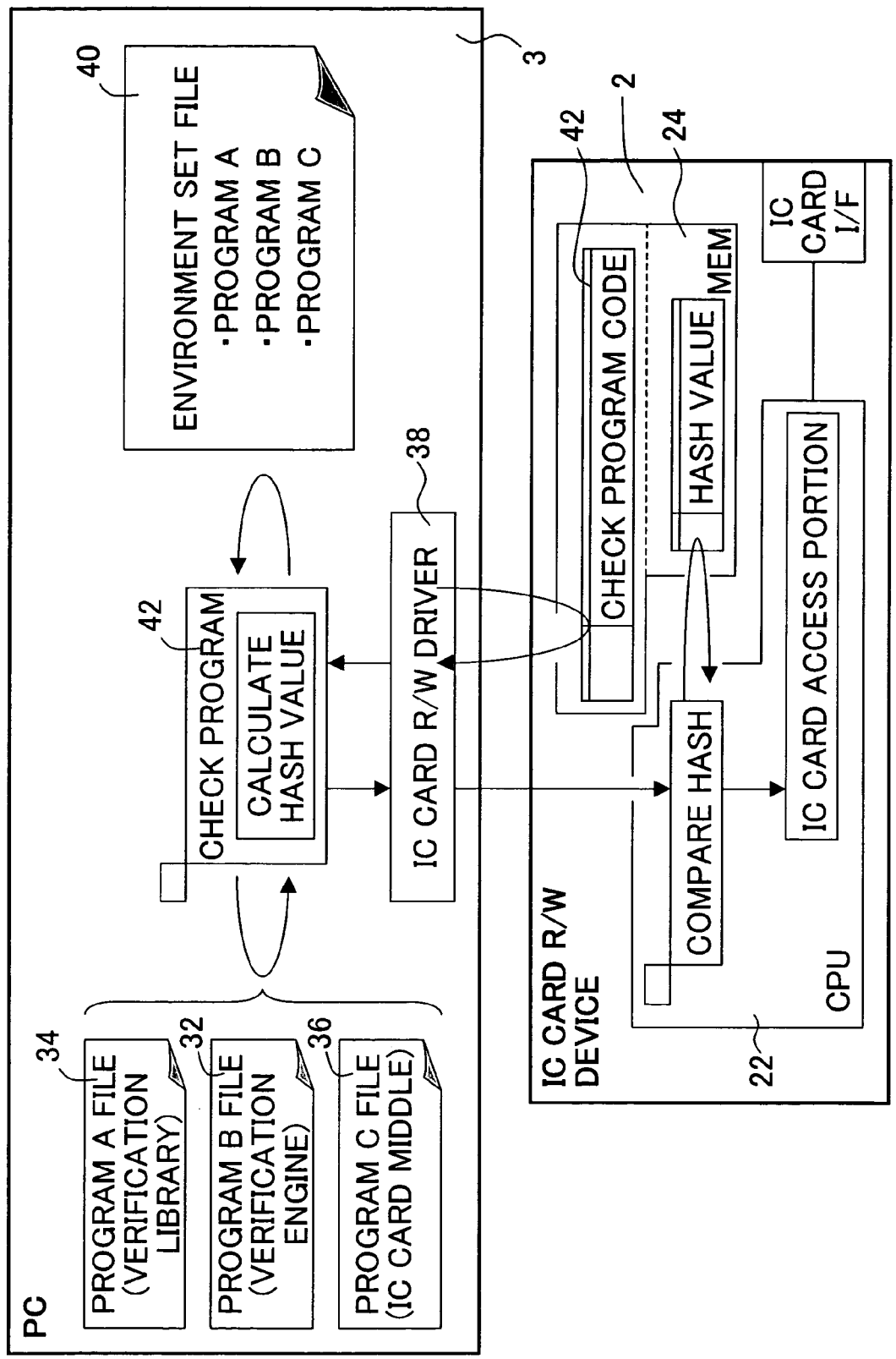

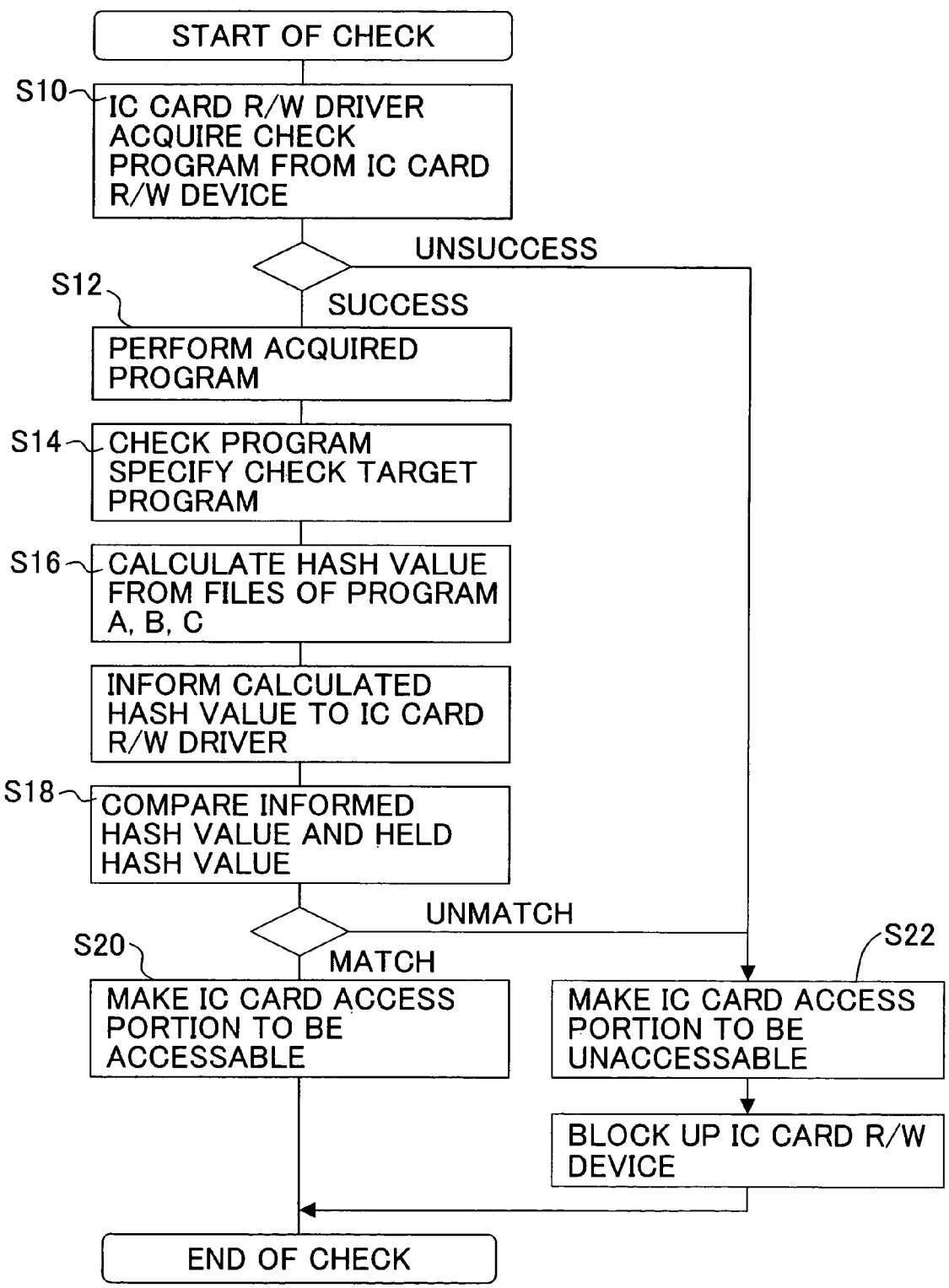

VERIFICATION SYSTEM AND PROGRAM CHECK METHOD FOR VERIFICATION SYSTEM

CROSS-REFERENCE TO RELATED APPLICATIONS

This application is based upon and claims the benefit of priority from the prior Japanese Patent Application No. 2004-239236, filed on Aug. 19, 2004, the entire contents of which are incorporated herein by reference.

BACKGROUND OF THE INVENTION

1. Field of the Invention

This invention relates to a verification system to verify individually entered data items for authentication or similar and a program check method for such a system, and in particular relates to a verification system and a program check method for a verification system which detects alteration of a program for verification.

2. Description of the Related Art

The spread of data processing equipment in recent years has been accompanied by such problems as the illicit release of personal information and illicit alteration of programs. In particular, measures are required to ensure the security of equipment handling personal data which is used for individual authentication.

For example, there exist numerous parts of the human body which enable differentiation of individuals, such as fingerprints and toe-prints, the retina of the eyes, facial features, and blood vessel patterns. With advances in biometrics technology in recent years, various devices have been provided for individual authentication by identifying such features of a part of the human body.

In particular, blood vessels in the palms and fingers and palm-prints provide a comparatively large volume of individual characteristic data, and users typically show little resistance to use of such characteristics, making them suitable for reliable individual authentication. In particular, blood vessel (vein) patterns do not change from the time of the fetus throughout life, are said to be unique among individuals, and are suitable for individual authentication.

In individual authentication using such blood vessel patterns, the user brings his hand close to an image capture device at the time of registration and authentication. The image capture device emits near-infrared rays, which are incident on the palm. The near-infrared rays which reflected from the palm are received by a sensor. Hemoglobin in the red corpuscles flowing in the veins have lost oxygen; this hemoglobin (reduced hemoglobin) absorbs near-infrared rays at wavelengths near 760 nanometers. Consequently when near-infrared rays are made incident on the palm, there is little reflection only in portions where there are veins, and the intensity of the reflected near-infrared rays enable identification of the positions of veins.

A user first employs the image capture device to register vein image data for his own palm on a server and card. Then, in order to perform individual authentication, the user causes the image capture device to read vein image data for his own hand. The vein patterns in the vein registration image retrieved using the user's ID and in the vein verification image read by the image capture device are verified to authenticate the individual.

In such verification for individual authentication, a program to access the registration data from a card and server, and a verification program to perform verification are used.

If such programs were altered, illicit acquisition of individual data and output of illicit verification results would be possible.

In the prior art, various methods have been proposed to prevent the installation of illicit programs in place of the correct programs. For example, a program to be installed may be provided with an electronic signature; the presence or absence of an electronic signature and the legitimacy of the program are judged, to prevent installation of illicit programs (see for example U.S. Pat. No. 6,347,398).

On the other hand, the more sophisticated functionality of personal computers in recent years and their increased convenience of use have made possible substitution of various types of application programs and middleware. The security functions of conventional OSs (Operating Systems) do not address all programs, and there exist programs which allow free substitution by the user. When programs for which such substitution is possible are used for verification and individual authentication, there is the possibility of illicit acquisition of individual information and illicit verification.

Further, the heightened awareness of software by users in recent years has been accompanied by concerns that the check program itself, installed on a personal computer, may be altered, so that it is difficult to guarantee the legitimacy of program checks.

SUMMARY OF THE INVENTION

Hence one object of the invention is to provide a verification system and a program check method for a verification system to easily check the legitimacy of a verification program for individual authentication within a verification apparatus, from outside the verification apparatus.

Another object of the invention is to provide a verification system and a program check method for a verification system to check the legitimacy of a verification program for individual authentication within a verification apparatus, from an external apparatus, connected to the verification apparatus, which provides verification data.

Still another object of the invention is to provide a verification system and a program check method for a verification system to check the legitimacy of a verification program for individual authentication within a verification apparatus, from an external apparatus, connected to the verification apparatus, which has tamper-proof properties.

In order to attain these objects, a verification system of this invention verifies data input by a user against registered data to authenticate the individual. This system has an input unit, to input data of the above user; a storage unit, to store the above registered data; and a processing unit, to execute a verification program, read the above registered data from the above storage unit, and perform verification with the above input data; the above storage unit has installed a check program which checks the above verification program, the above storage unit loads the above check program into the above processing unit, and the above processing unit executes the above check program to check for alteration of the above verification program.

A program check method of a verification system of this invention is a program check method of a verification system which verifies data input by a user against registered data to authenticate the individual. This program check method has a step of reading a check program from a storage unit in which is stored the above registered data into a processing unit which executes a verification program, reads the above registered data from the above storage unit, and performs verification with the above input data, and a step of executing the above check program to check for alteration of the above verification program in the processing unit.

In this invention, it is preferable that the storage unit receive the execution result of the above check program of the above processing unit, and check for alteration of the above verification program using the above execution result.

In this invention, it is preferable that, when alteration of the above verification program is detected, the above storage unit prohibit access to the above storage unit by the above processing unit.

In this invention, it is preferable that an environment file setting the program to be checked be provided in the above processing unit, and that the above check program checks the verification program set in the above environment file.

In this invention, it is preferable that the above storage unit receive the execution result of the above check program of the above processing unit, compare the above execution result with an execution result held in advance, and check for alteration of the above verification program.

In this invention, it is preferable that the above processing unit execute the above check program at the time of startup of the above processing unit.

In this invention, it is preferable that the above input unit constructed of a biological information detection unit which detects biological information of the above user.

In this invention, it is preferable that the above storage unit receive hash values of the above check program obtained using a hash algorithm of the above processing unit, compare the above hash values with hash values held in advance, and check for alteration of the above verification program.

In this invention, it is preferable that the above storage unit have a storage card held by the user, and a card reader/writer which reads and writes the above storage card.

In this invention, it is preferable that the above verification program comprise a storage unit access program to access the above storage unit; and a verification program to verify the above registered data read from the above storage unit against the above input data.

In this invention, a program (application) for verification in a processing unit is checked for alteration by a check program in the tamper-proof environment of a lower-level storage unit, so that illicit use of the verification system by means of program alteration can be prevented.

The check program exists in a storage unit in a tamper-proof environment, and moreover is retrieved to the processing unit, so that alteration of the check program itself can be prevented.

BRIEF DESCRIPTION OF THE DRAWINGS

FIG. 6 explains the operation in FIG. 5; and,

FIG. 7 shows the flow of program check processing in FIG. 5.

DESCRIPTION OF THE PREFERRED EMBODIMENTS

Below, embodiments of the invention are explained in the order of a verification system, program check processing method, and other embodiments.

Verification System

Figure 1:
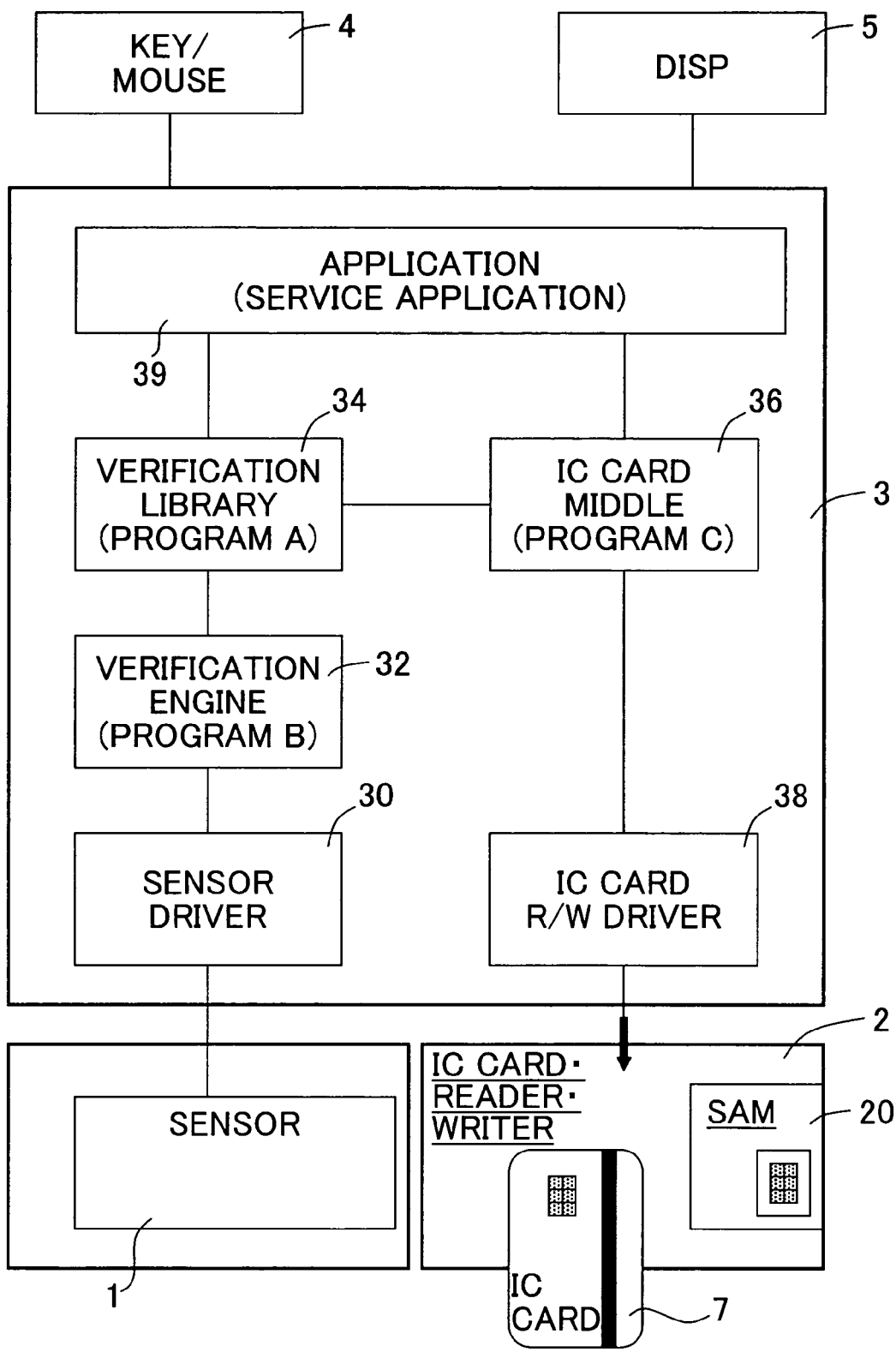
FIG. 1 shows the configuration of a verification system of one embodiment of the invention.
Figure 2:
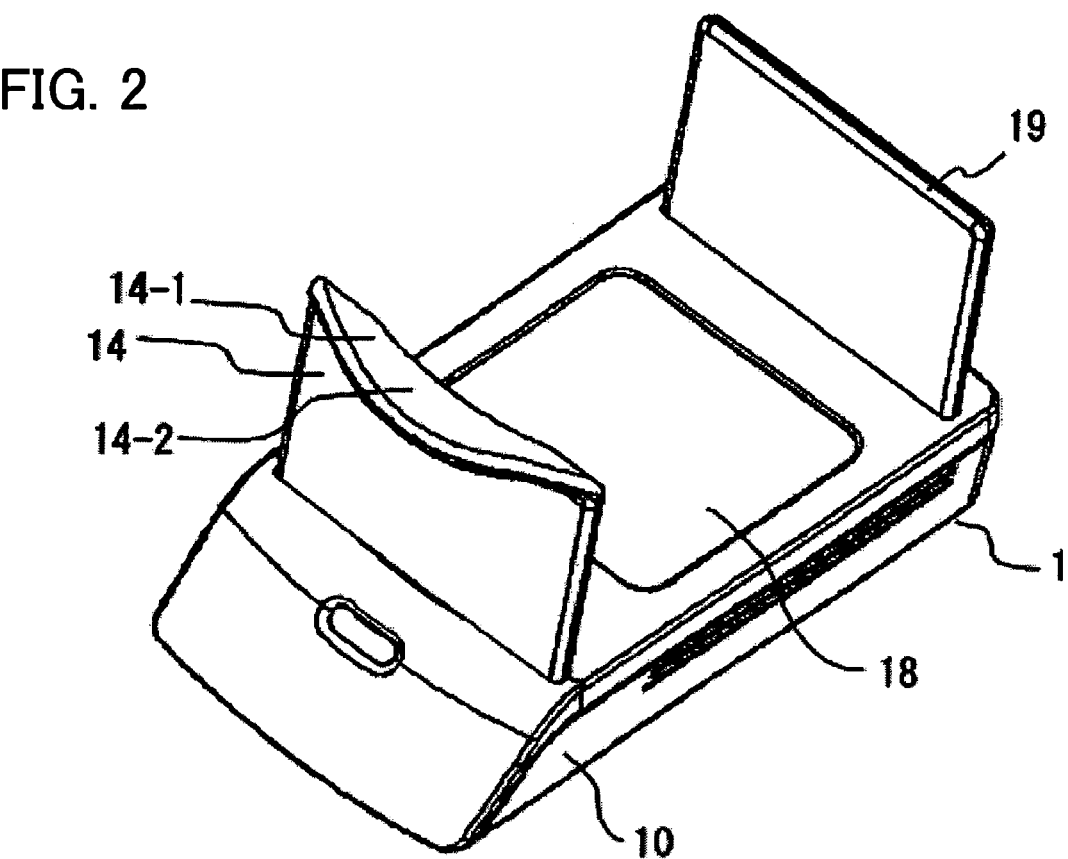
FIG. 2 is a perspective view of the input unit of FIG. 1.
Figure 3:
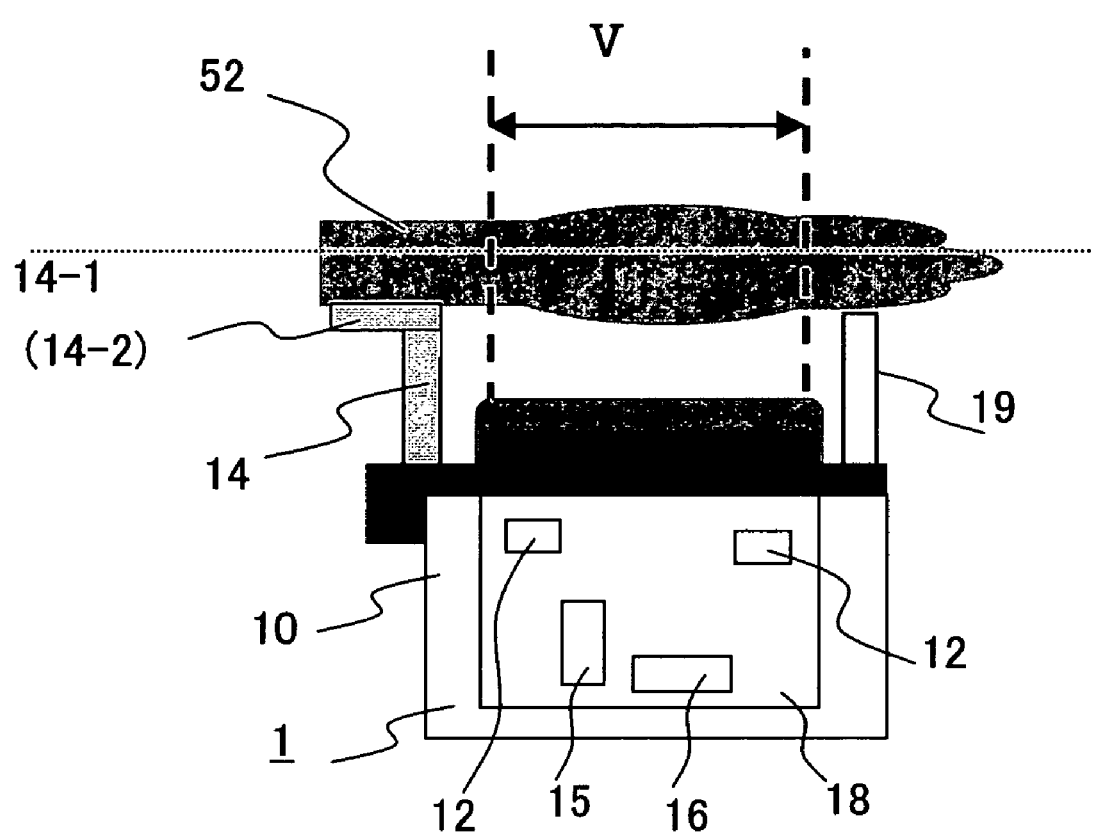
FIG. 3 shows the configuration of the input unit of FIG. 2.
Figure 4:
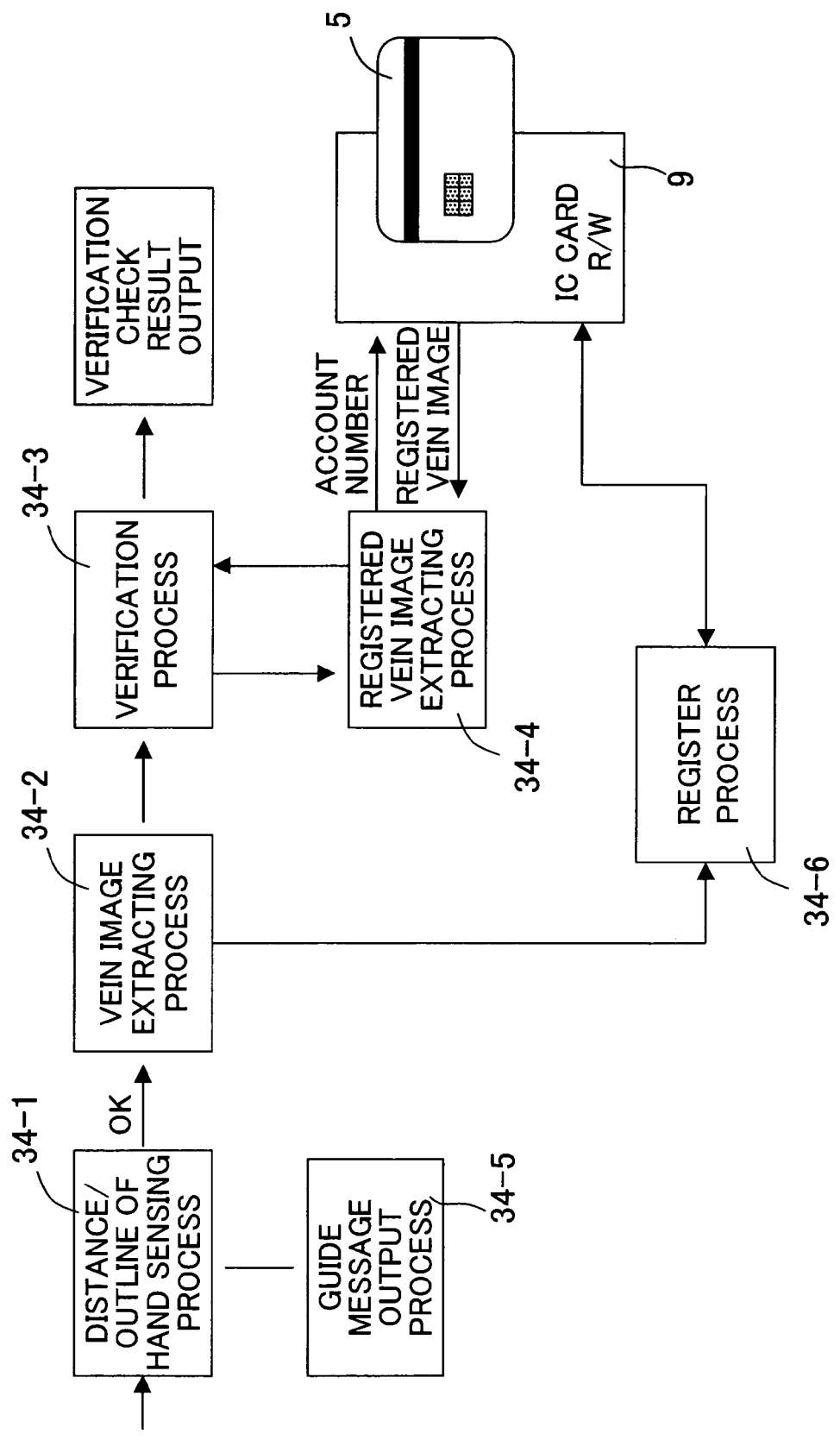
FIG. 4 is a functional block diagram of the biological information verification processing of FIG. 1.

FIG. 1 shows the configuration of a verification system of one embodiment of the invention, FIG. 2 is an external view of the sensor of FIG. 1, FIG. 3 shows the configuration of the sensor of FIG. 2, and FIG. 4 is a functional block diagram of the verification processing of FIG. 1.

FIG. 1 shows, as the verification system, an individual authentication system using blood vessel patterns. An individual authentication system used in a window area of a financial institution or similar for cash deposit/withdrawal and other transactions is explained as an example of the verification system, but application to ingress/egress control systems, crime prevention systems and other areas is also possible.

As the verification system, a personal computer (hereafter "PC") having a keyboard/mouse 4, display 5, and computer main unit 3 is connected to a palm image capture device (sensor) 1, explained in FIG. 2 and FIG. 3, and to an IC card reader/writer 2. In a financial affairs application, the PC is configured as a branch office terminal.

The IC card reader/writer 2 writes and reads individual data (here, palm vein pattern data, password number, account number, and similar) to and from an IC card 7 held by the user and inserted into the reader/writer 2. The IC card reader/writer 2 has a secure access module 20, described below, and has security functions to prevent tampering so as to make illicit changes.

The palm image capture device 1 of FIG. 1 has a sensor unit 18 in the substantial center of the main unit 10, as shown in FIG. 2. A front guide 14 is provided in the front portion (on the user side) of the sensor unit 18. The front guide 14 has a sheet of synthetic resin, transparent or substantially transparent. The front guide 14 serves the purposes of guiding the hand of the user in the front and of supporting the wrist. Hence the front guide 14 provides guidance to the user so as to guide and also support the wrist above the sensor unit 18. As a result the attitude of the palm, that is, the position, inclination and size, above the sensor unit 18 can be regulated.

The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. In addition, a rear guide 19 to support the fingers may be provided in the rear portion of the sensor unit 18.

As shown in FIG. 3, the sensor unit 18 is provided in the center with an infrared sensor (CMOS sensor) and focusing lens 16, and with a distance sensor 15, and on the periphery thereof with a plurality of near-infrared light-emitting elements (LEDs) 12. For example, near-infrared LEDs 12 are provided in eight places on the periphery, to emit near-infrared rays upwards.

The readable region V of this sensor unit 18 is regulated by the relation between the sensor, the focusing lens, and the near-infrared light emission region. Hence the position and height of the front guide 14 is set such that the supported wrist is positioned in the readable region V.

Returning to FIG. 1, in the computer main unit 3 are installed an operation application program 39, an IC card middleware program 36 which receives requests from the operation application program 39 and performs read/write processing of an IC card 7, and an IC card read/write driver 38 which receives requests from the IC card middleware program 36 and drives the IC card reader/writer 2.

In the computer main unit 3 are also installed a verification library program 34 which receives requests from the operation application program 39 and performs verification processing, a verification engine program 32, and a sensor driver 30 which receives requests from the verification engine program 32 and drives the sensor unit 1. The verification library program 34 has, as libraries, various processing programs which perform verification processing; the verification engine program 32 selects libraries of verification library programs 34 according to the verification process, and executes verification processing.

This verification processing is explained using FIG. 4. The verification library 34 comprises processing programs for a series of verification processing 34-1 to 34-5. The computer main unit 3 has, for example, a CPU, various types of memory, interface circuitry, and other circuitry necessary for data processing. The CPU executes the series of verification processing 34-1 to 34-5.

Distance/hand outline detection processing 34-1 receives a measured distance of the distance sensor 15 from the image capture device 1, judges whether the palm or other objects is within a prescribed range of distances from the sensor unit 18, and also detects the outline of the hand from an image captured by the sensor unit 18, and judges from the outline whether an image can be used in registration or verification processing. For example, the palm may not appear sufficiently in the image.

Guidance message output processing 34-5 outputs to the display 5 of FIG. 1 a message to guide the palm leftward, rightward, upward or downward, when the hand or similar is outside the image capture range judging from the distance measured by the distance sensor 15, or when the image cannot be used in registration or verification processing. By this means, the palm of the user is guided over the image capture device 1.

Blood vessel image extraction processing 34-2 extracts a vein image from an image of the hand when it is judged in hand outline detection processing 34-1 that the image has been captured with a proper placement of the hand. That is, grayscale data in the image of the palm due to differences in reflectivity is extracted.

Registered blood vessel image extraction processing 34-4 retrieves registered blood vessel image data corresponding to the individual ID (account number) from the storage portion of the IC card 7, via the IC card reader/writer 2 shown in FIG. 1. Verification processing 34-3 compares the blood vessel image data detected in blood vessel image extraction processing 34-2 with registered blood vessel image data, performs verification processing, and outputs a verification result.

In such an individual authentication system, if IC card middleware 36 which performs processing to access the IC card 7 is altered so that data from the IC card 7 is illicitly stored in addition to being used in verification, then individual data is leaked to a third party, and system reliability is reduced. Similarly, if the verification library 34 and verification engine 32 were illicitly replaced, the accuracy of the verification algorithm might be reduced, or verification results would no longer be reliable.

Hence a check must be performed to determine whether these programs 32, 34, 36 have been altered. This program check processing is explained below.

Program Check Processing

Figure 5:
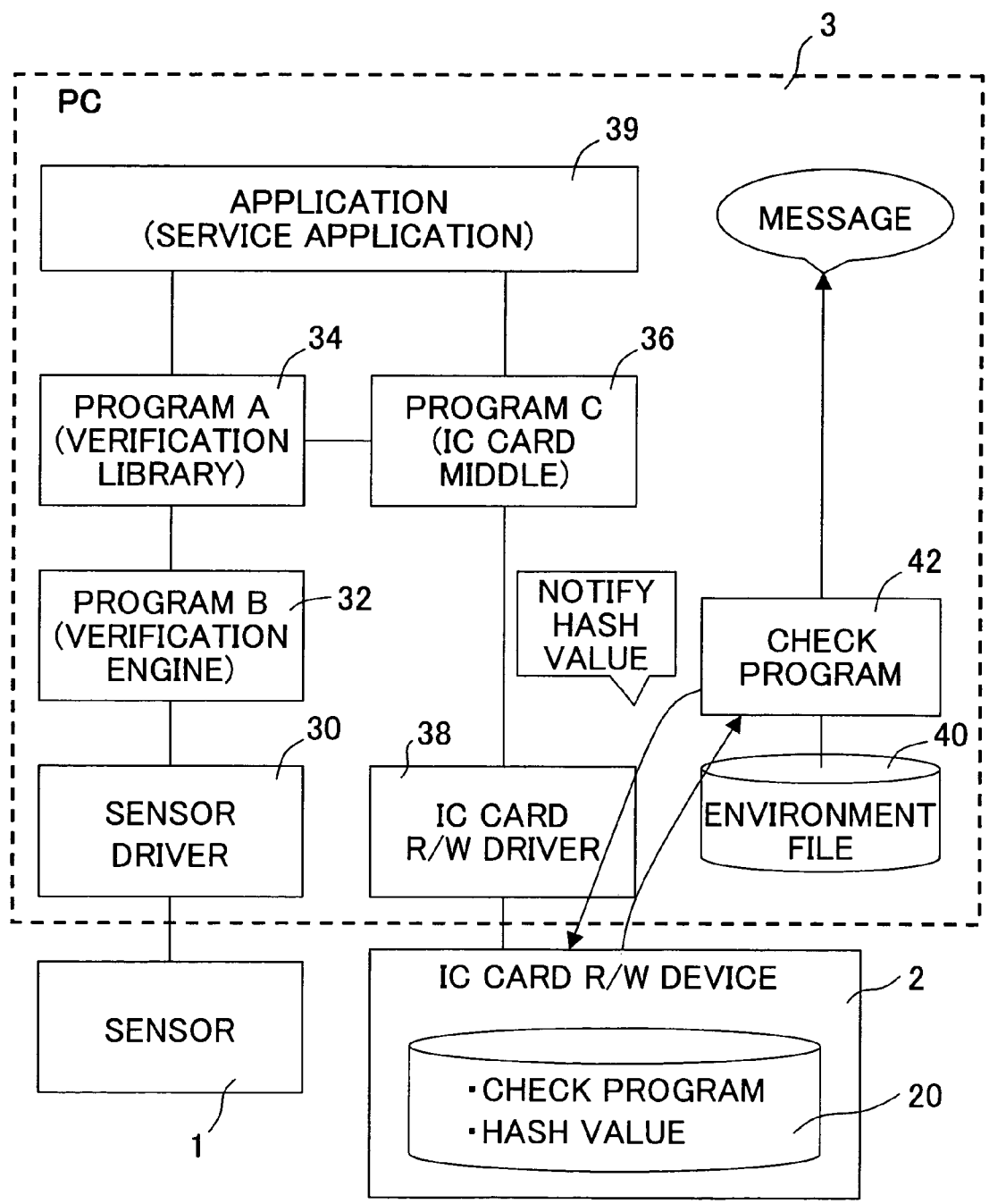
FIG. 5 shows the configuration of the program check processing in one embodiment of the invention.

FIG. 5 explains the program check processing of one embodiment of the invention; FIG. 6 is a functional block diagram of FIG. 5. As shown in FIG. 5, a check program and hash values to inspect check results are stored in the secure access module (SAM) 20 of the IC card reader/writer 2. On the other hand, an environment file 40 in which are set programs for checking is provided in the computer main unit 3.

As explained below, the check program 42 of the IC card reader/writer 2 is retrieved from the IC card reader/writer 2 to the computer main unit 3. The computer main unit 3 then executes this check program 42, checks the programs specified for checking in the environment file 40, and calculates hash values. The calculated hash values are sent to the IC card reader/writer 2. The IC card reader/writer 2 compares the hash values sent with stored hash values, to judge whether there has been alteration.

As shown in FIG. 6, the secure access module 20 of the IC card reader/writer 2 has a CPU 22 and memory 24. The memory 24 stores the code of the above-described check program 42 and has values to inspect check results. The CPU 22 compares hash values and accesses the IC card 7 when comparison result is good.

FIG. 7 shows the flow of program check processing in one embodiment of the invention. The processing of FIG. 7 is explained below, referring to FIG. 6.

(S10) At the time of apparatus startup, the IC card reader/writer driver 38 is taken to be an agent of the IC card reader/writer 2. After the IC card reader/writer driver 38 and IC card reader/writer 2 perform mutual authentication, the IC card reader/writer driver 38 retrieves the check program code from the memory 24 of the IC card reader/writer 2. When retrieval is not possible, the mutual authentication result is failure, and processing proceeds to step S22.

(S12) When the check program code is successfully retrieved, the IC card reader/writer driver 38 expands the retrieved check program code 42 into the memory of the computer main unit 3, and the computer main unit 3 begins execution of the check program.

(S14) The check program 42 first references the environment settings file 40 and identifies the files (programs) for checking.

(S16) The check program 42 uses a well-known hashing method to calculate hash values. That is, the hashing method is a data storage method which computes a portion of the data by using hashing function, and uses these results (hash values) as storage addresses. Here, in order to inspect for alteration of the program, a portion of the program data is calculated, and hash values are computed. Hence the check program 42 uses a prescribed hashing function to calculate hash values for each of the programs 32, 34, 36 to be checked. The hash values are then sent to the CPU 22 of the IC card reader/writer 2 via the IC card reader/writer driver 38.

(S18) The hash values in the memory 24 of the IC card reader/writer 2 are calculated in advance using the same hashing function as the data of the correct programs 32, 34, 36. The CPU 22 of the IC card reader/writer 2 compares the hash values sent with the hash values held in the memory 24. If the comparison result is non-coincidence, processing proceeds to step S22.

(S20) If the comparison result is coincidence, the CPU 22 enables access to the IC card access portion (functions), and checking is ended.

(S22) If on the other hand the check program could not be retrieved in step S10, or the comparison result is non-coincidence in step S18, the CPU 22 makes settings to disable access to the IC card access portion (functions). The IC card reader/writer 2 is then blocked. As a result it becomes impossible to access the IC card 7, and checking is ended. Consequently the individual information in the IC card 7 is protected, and as shown in FIG. 5, a message is displayed on the display 5.

In this way, a program (application) for verification within a computer main unit is checked for alteration by a check program in the tamper-proof environment of the lower-level IC card reader/writer 2, so that illicit use of the verification system through program alteration can be prevented. The check program 42 exists in the tamper-proof environment of the IC card reader/writer 2, and is retrieved into the computer main unit, so that alteration of the check program itself can also be prevented.

Further, a hashing algorithm with low computation load is used as the check program, so that checking can be performed rapidly at the time of startup of the apparatus.

OTHER EMBODIMENTS

In the above-described embodiment, registered individual data for use in verification is stored in an IC card reader/writer 2 and IC card 7; but application to a portable terminal, portable type storage device, or other storage unit is also possible. Also, in the above-described embodiment individual authentication was explained for the case of palm vein pattern authentication; but application to authentication of finger vein patterns, to palm-prints or other characteristics of the palm, as well as to fingerprints, facial features, and authentication using other body parts is also possible. Further, the case of a financial operation system was explained; but application to computers, to door opening and closing, use in place of keys, and to other operations where individual authentication is necessary is also possible.

The check program was explained as a hashing algorithm, but other check algorithms may be used.

Because a program (application) for verification in a processing unit is checked for alteration by a check program in the tamper-proof environment of a lower-level storage unit, illicit use of the verification system through program alteration can be prevented. Because the check program exists in a storage unit in a tamper-proof environment, and is retrieved into a processing unit, alteration of the check program itself can also be prevented. Consequently this invention contributes to prevent illicit utilization of individual authentication systems.

In the above, the invention has been explained in terms of embodiments; but various modifications are possible within the scope of the invention, and these are not excluded from the scope of the invention.

What is claimed is:

1. A verification system, which verifies data input by a user against registered data to perform individual authentication, comprising:
an input unit for inputting data of said user;
a storage unit for storing said registered data; and
a processing unit for executing a verification program that reads said registered data from said storage unit and verifies said registered data against said input data,
wherein said storage unit installs a check program which checks said verification program and loads said check program into said processing unit, and
said processing unit executes said check program to check for alteration of said verification program, and wherein said storage unit comprises:
a storage card held by the user; and
a card reader/writer which reads and writes said storage card, receives an execution result of said check program from said processing unit, and checks for alteration of said verification program by said execution result, and
wherein said card reader/writer prohibits access to said storage card by said processing unit, when said card reader/writer detects alteration of said verification program.

2. The verification system according to claim 1, wherein said processing unit has an environment file in which are set programs to be checked and executes said check program for verification programs set in said environment file.

3. The verification system according to claim 1, wherein said card reader/writer receives the execution result of said check program by said processing unit, compares said execution result with an execution result held in advance, and checks for alteration of said verification program.

4. The verification system according to claim 3, wherein said card reader/writer receives hash values of said check program calculated by said processing unit using a hashing algorithm, compares said hash values with hash values held in advance, and checks for alteration of said verification program.

5. The verification system according to claim 1, wherein said input unit, at the time of startup of said processing unit, executes said check program.

6. The verification system according to claim 1, wherein said input unit comprises a biological information detection unit which detects biological information of said user.

7. The verification system according to claim 1, wherein said verification program comprises:
a storage unit access program to access said storage unit; and
a verification program which verifies said registered data read from said storage unit against said input data.

8. A program check method for a verification system, which verifies data input by a user against registered data and performs individual authentication, comprising the steps of:
reading a check program from a card reader/writer which reads and writes a storage for storing said registered data into a processing unit, said processing unit executes a verification program that reads said registered data from said storage and performs verification with said input data;
executing said check program, to check for alteration of said verification program in said processing unit;
receiving an execution result of said check program by said processing unit with said card reader/writer;
checking for alteration of said verification program using said execution result in said card reader/writer; and
prohibiting access to said storage card by said processing unit when alteration of said verification program is detected in said card reader/writer.

9. The program check method for a verification system according to claim 8,
wherein said checking step comprises a step of checking the verification programs set in an environment file provided in said processing unit by said check program.

10. The program check method for a verification system according to claim 8, wherein said checking step comprises:
a step of receiving the execution result of said check program by said processing unit in said card reader/writer; and a step of comparing said execution result with an execution result held in advance, and checking for alteration of said verification program in said card reader/writer.

11. The program check method for a verification system according to claim 10, wherein said checking step comprises:
    a step of receiving hash values of said check program computed by said processing unit using a hashing algorithm; and
    a step of comparing said hash values with hash values held in advance and checking for alteration of said verification program.

12. The program check method for a verification system according to claim 8, wherein said checking step comprises a step of executing said check program at the time of startup of said processing unit.

13. The program check method for a verification system according to claim 8, further comprising a biological information detection step of detecting biological information of said user for said verification.

14. The program check method for a verification system according to claim 8, wherein said check step comprises a step of checking a verification program having a storage unit access program to access said storage unit and a verification program which verifies said input data against said registered data read from said storage unit.

* * * * *